United States Patent [19]
Gillberg-LaForce

[11] Patent Number: 4,794,041
[45] Date of Patent: Dec. 27, 1988

[54] ACTIVATION OF POLYETHYLENE TEREPHTHALATE MATERIALS FOR IMPROVED BONDING TO ADHESIVES

[75] Inventor: Gunilla E. Gillberg-LaForce, Summit, N.J.

[73] Assignee: Hoechst Celanese Corp., Somerville, N.J.

[21] Appl. No.: 534,229

[22] Filed: Sep. 21, 1983

[51] Int. Cl.$^4$ .................. B32B 27/02; B32B 27/16; B32B 27/36; D02G 3/48
[52] U.S. Cl. .................................. 428/394; 156/167; 156/272.8; 156/273.3; 156/275.7; 428/480
[58] Field of Search .................. 156/160–161, 156/167, 272.2, 272.6, 272.8, 273.3, 275.7, 308.2, 308.6, 330, 331.4, 910; 428/394, 480; 427/35, 36, 44; 152/451, 565

[56] References Cited

U.S. PATENT DOCUMENTS 2,956,899 10/1960 Cline ............................... 427/36
3,101,275 8/1963 Cairns et al. .................... 427/36

Primary Examiner—Merrell C. Cashion, Jr.
Attorney, Agent, or Firm—Burns, Doane, Swecker & Mathis

[57] ABSTRACT

A method for the activation of polyethylene terephthalate materials such as tire yarns is provided whereby the adhesion of the material to an adhesive is enhanced. The material is activated by means of an electron beam to promote free radical formation, which free radicals are permitted to form carboxyl and hydroxyl functionalities under ambient conditions. Such functionalities improve the adhesion with a suitable adhesive such as an epoxy or isocyanate adhesive which is reactive to carboxyl or hydroxyl functionalities and which may be applied to the material before or after activation thereof.

22 Claims, No Drawings

ACTIVATION OF POLYETHYLENE TEREPHTHALATE MATERIALS FOR IMPROVED BONDING TO ADHESIVES

BACKGROUND OF THE INVENTION

The present invention relates to the production of surface-modified polyethylene terephthalate materials which are desirably adapted for use as reinforcing substrates in rubber-based products.

As discussed in U.S. Pat. Nos. 3,419,463; 3,729,336; and 3,755,165 regarding the manufacture of rubber goods requiring cord reinforcement, such as in pneumatic tires, friction belts and the like, the strength and durability of the adhesive bond between the reinforcing cord and the rubber being reinforced is important. The reinforcing cord serves to increase the tensile strength of the rubber-based goods and restrict the degree of distortion during use. The reinforcing cord is normally placed within the rubber mass and must be firmly bonded to the rubber to provide a unitary structure. Stress will occur at the interface between the reinforcing element and the rubber during use. Accordingly, good bond strength and adhesion is needed to prevent separation at the interface.

Polyester reinforcing materials are increasingly being employed in the reinforcement of such rubber-based goods, and particularly as tire cord, in the manufacture of rubber tires. These polyester reinforcing materials (e.g., polyethylene terephthalate filament or cord) possess physical characteristics such as high strength, flex resistance, high stretching modulus and low creep which make them outstanding materials for such reinforcement. However, the use of polyester reinforcing materials in rubber reinforcement applications is subject to certain problems due to the poor rubber adhesion properties associated with unmodified polyester materials.

The use of aqueous dispersions containing a combination of a resorcinol-formaldehyde condensate and an elastomer latex (referred to as an RFL dip) is best known as an effective treating agent for improving the rubber adhesion of some synthetic polymer reinforcing materials such as nylon. However, the RFL dips do not satisfactorily overcome the problems encountered with the adhesion of unmodified polyester reinforcing materials due to the low level of reactive functional groups in such materials (e.g., polyethylene terephthalate).

Attempts have been made to find new treating agents to improve the rubber adhesion of polyester reinforcing materials or, in the alternative, to treat the polyester with additional agents in combination with the RFL dip treatment to improve the adhesion For example, U.S. Pat. No. 3,383,242 discloses pretreatment of polyethylene terephthalate yarn by use of an aqueous dispersion of a curable combination of a diglycidic ether of an aliphatic diol and an amine curing agent and a water-dispersible lubricating agent. U.S. Pat. No. 3,755,165 discloses a tire yarn finish composition consisting of a lubricating oil, an antistatic agent, an emulsifier, water and as an adhesive promoting agent an aliphatic diisocyanate. U.S. Pat. No. 3,834,934 discloses an adhesive composition for fibrous material comprising an admixture of RFL and a triallyl cyanurate-resorcinol-formaldehyde reaction product. U.S. Pat. No. 3,729,336 discloses treatment of polyester fibers with a composition of a copolymer comprising crystallizable ester units identical to those in the polyester fiber, poly-oxyalkylene groups and polyepoxy containing groups and a polyepoxide followed by application of RFL. U.S. Pat. No. 4,031,288 discloses pretreatment of tire cord with a solvent solution of a polyisocyanate followed by application of an adhesive such as RFL. U.S. Pat. No. 4,187,349 discloses an adhesive system for polyester tire cord comprising a heat-curable admixture of a polyepoxide and a linear carbon-to-carbon addition polymer containing pendent aminimide and N-pyrrolidonyl groups.

U.S. Pat. Nos. 2,905,582; 3,278,333; 3,547,764; 3,642,553; 3,647,513; and 3,939,294 each disclose the use of isocyanate-based adhesives to enhance the adhesion of polyethylene materials to rubber. U.S. Pat. Nos. 3,308,007; 3,547,764; and 3,803,035 each disclose the use of epoxy-based adhesives to enhance the adhesion of polyethylene materials to rubber.

U.S. Pat. No. 3,111,424 discloses a method whereby an irradiated polymer substrate (such as polyethylene terephthalate) is coated with a chemically dissimilar coating comprised of an ethylenically unsaturated compound. Suitable irradiation means include a resonant cavity accelerator, Van der Graaff generator, betatron, synchrotron, cyclotron, etc. U.S. Pat. No. 3,188,229 discloses a process for adhering an organic material on a dissimilar organic polymer substrate such as polyethylene terephthalate using high energy ionizing radiation. European Patent Application No. 43,410 discloses a process for producing an adhesive active polyester yarn wherein the yarn is initially exposed to ultraviolet irradiation and subsequently contacted with an epoxy silane-containing solution. U.S. Pat. No. 4,328,324 discloses a process for treating aromatic polyamide fibers to improve the adhesion thereof to epoxy resins and rubber wherein the fibers are passed through a plasma effected by means of a high frequency electrical field.

Although many of these prior art treatments increase the adhesion between the polyester and the rubber, in the case of polyethylene materials having a reduced carboxyl group content to improve the hydrolytic stability of the yarn, the adhesion to rubber is in many cases insufficient especially if reduced curing temperatures for the resorcinol-formaldehyde-latex RFL are used.

OBJECTS AND SUMMARY OF THE INVENTION

Accordingly, it is an object of the present invention to provide a process for treatment and surface modification of polyester materials whereby the polyester materials have improved adhesion to rubber adhesives.

It is another object of this invention to provide multi-coated polyethylene terephthalate filament and yarn products which exhibit improved adhesive properties in rubber-reinforcement applications.

It is a further object of the invention to provide rubber-based articles which are reinforced with a novel type of strongly adherent polyethylene terephthalate fiber material.

In one aspect of the present invention, there is thus provided a process for treatment of a polyethylene terephthalate material for improved adhesion in subsequent rubber-reinforcing applications which comp ises (1) activating the surface of the polyethylene terephthalate material with an electron beam from a suitable source to promote free radical formation on said material; (2) permitting said free radicals to form hydrophilic carboxyl and hydroxyl functional groups under ambient conditions; and (3) applying an adhesion composition to said material which is reactive to carboxyl or hydroxyl functional groups.

In another aspect of the present invention, there is thus provided a process for treatment of a polyethylene terephthalate filament or yarn for improved adhesion in subsequent rubber reinforcing applications which comprises (1) applying a spin finish coating to the filament or yarn surface; (2) activating the surface of the polyethylene terephthalate material with an electron beam from a suitable source to promote free radical formation on said material; (3) permitting said free radicals to form hydrophilic carboxyl and hydroxyl functional groups under ambient conditions; and (4) applying an adhesive composition to said material which is reactive to carboxyl or hydroxyl functional groups.

In another aspect of the present invention, the adhesive composition is applied to the polyethylene terephthalate material before the material is activated with the electron beam.

In still yet another aspect of the present invention, polyethylene terephthalate materials treated according to the above processes ar provided.

DETAILED DESCRIPTION OF THE INVENTION

In accordance with the present invention, a polyethylene terephthalate material is activated with an electron beam to enhance the adhesion of the material to a suitable rubber adhesive such as an epoxy or isocyanate adhesive. Such activation results in the formation of free radicals which, under ambient conditions, are permitted to form carboxyl and hydroxyl functional groups which react with the applied adhesive. Such polyethylene terephthalate materials may take many forms including but not being limited to filaments, fibers, threads, yarns, cords, etc.

The term "spin finish" as employed herein is intended to include compositions which are normally employed in the fiber industry for lubrication of filaments or yarns during textile operations; i.e., during the spinning, drawing, twisting, and weaving or otherwise fabricating individual filaments or staple fibers into various textile articles. In addition to the essential lubricating agentaand its solvent or emulsifying liquid such as water, small amounts of other modifying agents may also be present. Generally, spin finishes comprise a lubricating oil, an antistatic agent, and an emulsifier.

Suitable lubricating oils include but are not limited to substances such as palm oil, coconut oil, cottonseed oil, mineral oil, glycerides, polyglycol esters, butyl stearate, octyl stearate, esters of oleic acid, trimethylolpropane/-caprylic acid esters, 2-methyl-2-propylpropane-1,3-diol-dilaurate, 2-ethyl-2-butyl-propane-1,3-dioldilaurate, pentaerythritol esters, polyethylene oxide-polypropylene oxide adducts, polysiloxanes and the like.

The spin finish may contain an antistatic agent to reduce the electrostatic charge of the filament during its processing into a cord or fabric. Useful agents include cationic compounds containing a quaternary ammonium-, pyridinium-, imidazolinium-, and quinolinium function, and phosphated alcohols, ethyloxated amides, and the like.

The lubricant is preferably dispersed in water with the aid of an emulsifying agent including surface active organic compounds such as the polyoxyethylene adducts of fatty acids, higher fatty alcohols, sorbitol esters and sorbitans as well as phosphate esters, sulfonated aromatic petroleum hydrocarbons, sulfonated naphthenates, sulfated vegetable oils, polyglycerol esters, glycerol mono-di-fatty acid esters, and the like.

The spin finish is applied to the polyester filaments or yarn in the form of a dilute aqueous solution or as neat oils. The dry weight of spin finish on the polyester will vary between about 0.1 to 5 weight percent, based on the weight of filament or yarn.

A typical water dilutable spin finish will contain the following proportions of ingredients, based on the total weight of ingredients present:

Lubricant: 20 to 60%
Antistatic agent: 0.5 to 25%
Emulsifier: 5 to 50%

The application of the spin finish to the polyethylene terephthalate filament or yarn can be accomplished by means of a kiss roll, a metered applicator or spray which are normally used for the application of spin finishes.

The polyethylene terephthalate material is activated by exposure to an electron beam from a suitable source. Preferably, the source possesses an acceleration voltage and beam current to allow processing at acceptable production speeds (i.e., at least about 50 feet/minute). The acceleration voltage determines the penetration depth into the polymeric material and thus the thickness of material which can be treated at a single passage. The dose received by the material determines the degree of reaction. The dose is directly proportional to the beam current and inversely proportional to the product speed through the beamer. The dose is generally selected to obtain activation all the way through the material in a single passage. Typical response curves are discussed in articles by R. Kardashian and S. V. Nablo, *Adhesive Age*, December, 1982, page 25; S. V. Nablo and E. P Tripp, III, *Adhesive Age*, February, 1979, p. 74; and S. V. Nablo, J. R. Uglum and B. S. Quintal, *Non-Polluting Coatings and Coating Processes*, ed. J. L. Gordon and J. W. Prane, Plenum Press, N.Y., 1973, pp. 179-194, each herein incorporated by reference.

The fiber diameter of a typical tire yarn is about 20 to 30 microns and an acceleration voltage of larger than about 50 KV (penetration depth of greater than 25 microns) is preferred during the treatment of tire yarns. The dose rate can be varied within wide limits but a preferred range is from about 0.5 to 20 megarads. Various types of electron beam processors may be employed to provide the desired acceleration voltages and beam currents and are well known to those skilled in the art, such as, for example, those marketed by Energy Sciences, RPC Industries, and Radiation Dynamics.

Once the polyethylene terephthalate has been activated by contact with the electron beam resulting in the formation of free radicals on the surface thereof, the free radicals are permitted to form hydrophilic hydroxyl and carboxyl functionalities which are reactive with the adhesive. Such functionality formation readily occurs as a result of contact between the activated polyethylene terephthalate and the atmosphere under ambient conditions.

Once the carboxyl and hydroxyl functionalities are formed, the adhesive may be applied to the polyethylene terephthalate. With reference to the adhesive, any of the adhesive compositions which are reactive to carboxyl and hydroxyl functionalities and which are generally used to bond or adhere polyester fibers to RFL are suitable for use in the present invention. Normally, the polyester in the form of fibers is contacted with a solution, suspension or emulsion of the adhesive composition, as for example, an aqueous or mixed solvent solution or dispersion containing a water-soluble adhesive. Contact is achieved by known means such as dipping, spraying, kiss rolls, etc. Exemplary water-based adhesives suitable for use herein include but are not limited to multifunctional isocyanates, epoxy compounds (which may be multifunctional) or combinations thereof as well as combinations of such adhesives with RFL dips which can be applied either in one dip or in a series of dips. The adhesive is usually present in the overall composition in an amount in the range of from about 1 to 40 percent by weight. However, higher and lower amounts may be used if desired.

The adhesive composition is applied to the polyester fibers such that an application of carboxyl and hydroxyl reactive adhesive to the fibers in the range of from about 0.05 to 10.0 percent by weight of the polyester fibers and preferably from about 0.1 to 2.0 percent, for example about 0.3 percent, occurs. The adhesive dipping is normally conducted at room temperature, but higher and lower temperatures may be used if desired.

The carboxyl and hydroxyl reactive adhesive can be applied in a separate top-coating process and the treated polyester material allowed to dry at room temperature or optionally at an increased temperature. The top-coating process in this case is preferably performed directly after the electron beam treatment to diminish processing costs. Alternatively, a double dip process may be used in which a carboxyl and hydroxyl reactive adhesive is applied (e.g., an isocyanate and polyepoxide-based adhesive) and cured immediately before an RFL treatment under conditions normally employed by those skilled in the art. An activated RFL dip (e.g., an RFL dip containing blocked isocyanates, epoxy resins and/or triallyl cyanurates) can also be used in a single dip system.

As an alternative embodiment of the invention, the adhesive may be applied to the polyethylene terephthalate material before the material is exposed to the electron beam. The amounts and techniques of applying the adhesive are the same as previously described. Of course, the adhesive treated material must be exposed to the electron beam while the adhesive retains its original reactivity or after it has been reactivated (e.g., by heating) so that it is capable of reacting with the hydroxyl and carboxyl functionalities on the activated material. In this embodiment, the RLF is applied to the material after beam activation to avoid premature cross-linking by the electron beam.

After the adhesive and RFL has been applied to the polyester material, it may thereafter be adhered to rubber. For example, the polyester fiber may be imbedded in vulcanizable rubber and the rubber vulcanized in a conventional manner. When polyester material is treated in the manner described above a substantially improved adhesion results between the polyester fibers and rubber.

An exemplary epoxy resin may be prepared by the condensation of bisphenol A (4,4' isopropylidene diphenol) and epichlorohydrin. Also, other polyols, such as aliphatic polyols and novolak resins (e.g., phenol-formaldehyde resins), acids or other active hydrogen-containing compounds may be reacted with epichlorohydrin for the production of epoxy resins suitable for use in the invention. Exemplary epoxy compounds include multifunctional glycidyl ethers, multifunctional sorbitol epoxy and silane epoxy compounds. The epoxy compounds are preferably applied from solutions containing known basic catalysts for the epoxy group reaction with carboxyl and hydroxyl groups such as inorganic and organic bases. Exemplary epoxy resins are disclosed in U.S. Pat. Nos. 2,902,398 and 3,247,043, each herein incorporated by reference.

A variety of epoxy resin curing agents may be employed in conjunction with the epoxy resin. The curing or hardening of the epoxy resin typically involves further reaction of the epoxy or hydroxyl groups to cause molecular chain growth and crosslinking. The term "curing agent" as used herein is accordingly defined to include the various hardeners of the co-reactant type. Illustrative classes of known epoxy curing agents which may be utilized include aliphatic and aromatic amines, polyamides, tertiary amines, amine adducts, acid anhydrides, acids, aldehyde condensation products, etc.

Exemplary isocyanates may comprise but are not limited to aromatic, aliphatic, cycloaliphatic isocyanates which may be either blocked or unblocked. Suitable isocyanates include methylene-bis-(4-phenyl isocyanate), naphthalene di and triisocyanates, 2,4-tolylene diisocyanate, p,p',p''-triphenylmethane triisocyanate, hexamethylene diisocyanate and 2,4-chlorophenylene diisocyanate.

When isocyanate compounds containing two or more isocyanate groups are used, they may be either aromatic or aliphatic in nature. Suitable isocyanates include toluene-2,4-diisocyanate, p-phenylene diisocyanate and 4,4'-diphenyl methane diisocyanate. Aliphatic diisocyanates, such as hexamethylene diisocyanate, may also be used. Triisocyanates, such as 4,4'-triphenyl methane triisocyanate and the reaction product of trimethylolpropane and 2,4-toluene diisocyanate in a 1:3 mole ratio, are also suitable.

Other suitable isocyanates include 2,6-toluene diisocyanate; 1,6-toluene diisocyanate; diphenyl methane 4,4'-diisocyanate; 3,3'-dimethyl diphenyl methane 4,4'-diisocyanate; 3,3'-dimethyl-4,4'-diphenylene diisocyanate; 3,3'-ditoluene-4,4'-diisocyanate; o,m,p-phenylene diisocyanate; methane diisocyanate; chlorophenylene-2,4-diisocyanate; chlorophenylene-2,4-toluene diisocyanate; 3,3'-dichlorodiphenyl-4,4'-diisocyanate; 4-chloro-1,3-phenylene diisocyanate; xylene-1,4-diisocyanate; diphenyl methane-4,4'-diisocyanate; 1,5-naphthalene diisocyanate; 1,4-naphthalene diisocyanate and the corresponding diisothiocyanates and the isocyanateisothiocyanates; alkylene diisocyanates, such as 1,6-hexamethylene diisocyanate; 1,2-ethylene diisocyanate; 1,3-propylene diisocyanate; 1,4-tetramethylene diisocyanate; 1,5-pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate-isothiocyanates; cycloaliphatic diisocyanates, such as 1,3-cyclohexylene disocyanates; 1,3-cyclopentylene diisocyanates; 1,4-cyclohexylene diisocyanate, 4,4'-methylenebis-(cyclohexylisocyanate) and the corresponding diisothiocyanates and isocyanateisothiocyanates; triisocyanates, such as triphenyl methane triisocyanate; 1,3,5-benzene triisocyanate, and the corresponding isothiocyanates and isocyanate-isothiocyanates.

Aromatic diisocyanates, especially derivatives thereof having electronegative substituents, are particularly desirable due to their increased reactivity. The electronegative substituents, such as, for example, $-NO_2$, $-C\equiv N$, $-CHO$,

—COOH, —CONH$_2$,

or —CF$_3$ groups, apparently assist the polymerization tendency of the isocyano or isothiocyano groups.

Suitable blocking agents include but are not limited to various phenols such as phenol, cresol, xylenol, and thiophenol; various alcohols such as methanol, ethanol, butanol, 2-ethylhexanol, cyclohexanol, 2-methoxyethanol and 2-ethoxyethanol; and other active hydrogen-containing compounds such as ethyl acetoacetate and diethyl malonate. Exemplary blocked isocyanates include aliphatic polyisocyanates such as a cyclohexylene diisocyanate polyol urethane which can be blocked with an aliphatic alcohol such as methanol or an aromatic hydroxyl-containing compound such as phenol or other compound which contains active hydrogen capable of reversible reaction with the isocyanate such as caprolactam; an aliphatic isocyanate such as cyclohexylene diisocyanate which can be blocked as noted above; and an aromatic polyisocyanate such as a toluene diisocyanate polyol urethane or an aromatic isocyanate such as toluene diisocyanate which can be blocked as noted above. Blocked isocyanates and their method of preparation are well-known and will not be discussed in greater detail herein.

As previously discussed, after the at least one adhesive composition has been applied to the activated material, such as tire yarn (or unactivated material which is then activated), a phenolic-aldehyde-latex adhesive may be superimposed on the material. In those instances where the at least one adhesive composition is applied after the material is activated, application of the two types of adhesives may be applied together.

The term "phenolic-aldehyde-latex adhesive" is meant to include phenolic-aldehyde-latex containing compositions which are known and used in the textile and rubber industries for the bonding of polyester fibers to rubber. The phenolic-aldehyde component (e.g., a resole) can be any condensation product of an aldehyde with a phenol which can be heat-cured to form an infusible material. A typical phenolic-aldehyde-latex adhesive composition is a formulation containing resorcinol-formaldehyde resin and a rubber latex such as a styrene-butadiene vinyl pyridine latex (e.g., an RFL adhesive). The preparation of such adhesives is well known in the art and will not be discussed further herein.

The phenolic-aldehyde-latex adhesive is generally applied in a quantity of between about 2 to 20 weight percent (solids retention), based on the weight of the polyester material. The phenolic-aldehyde-latex adhesive is preferably applied after the filament or yarn has been spun into cord or woven into fabric. Preferably, the adhesive-coated material is subjected to a drying and curing treatment, both to eliminate the moisture in the coating and to complete the condensation of the phenolic-aldehyde component. The drying and curing operation is conveniently conducted in the presence of hot circulating air at a temperature of between about 120° to 260° C.

The surface-modified, strongly adherent polyester materials of the present invention are useful as reinforcing materials in the preparation of reinforced rubber-based materials such as pneumatic tires, conveyor belts, hoses, transmission belts, raincoats, and the like.

While not wishing to be bound by the following theory, it is believed that the treatment of the polyethylene terephthalate material in accordance with the present invention causes free radicals to be formed which, upon formation, react with water and/or oxygen in the ambient environment to form hydroxyl and carboxyl groups on the surface thereof. This increased functionality of the polyethylene material enhances the reactivity thereof to adhesives such as epoxy or isocyanate-based adhesives which are reactive to hydroxyl and carboxyl functionalities. The adhesion of the adhesive to the polyethylene terephthalate material is accordingly enhanced.

The following comparative example and example further illustrate the improved adhesion obtained by the present invention. The reactants and other specific ingredients are presented as being typical, and various modifications can be derived in view of the foregoing disclosure without departing from the scope of the invention.

COMPARATIVE EXAMPLE

A 1000/192 polyethylene terephthalate tire yarn is made using a continuous spin draw process such as described in U.S. Pat. No. 4,044,189 the contents of which are incorporated by reference. The yarn is contacted after extrusion from the spinneret with a spin finish prepared by mixing 50 percent by weight of a polysiloxane lubricant, 1 percent by weight of a phosphated alcohol antistatic agent and 49 percent by weight of a mixture of ethoxylated emulsifiers based on sorbitan monooleate and alkyl phenols and then diluting the finish with water to obtain a clear transparent spin finish containing 15 percent solids. The yarn is passed over pretension, feed and draw rolls and is contacted with an aqueous solution containing polyfunctional sorbitol epoxy at room temperature such that the adhesive is present in an amount of 0.25% by weight of the yarn.

The yarn is then treated using a dip pick-up of 3.8% with a resorcinol-formaldehyde-latex (RFL) adhesive composition having the following ingredients:

| Ingredients | Parts By Wt. |
| --- | --- |
| NaOH (50%) | 2.6 |
| Resorcinol | 16.6 |
| Formaldehyde (37%) | 17.2 |
| Terpolymer rubber latex of styrene/butadiene-1,2/ vinylpyridine 15/70/15 (41%) | 245 |
| Water | 331 |

The adhesive composition is prepared by adding 16.6 parts of the resorcinol to 331 parts of water, followed by the addition of 17.2 parts of formaldehyde (37%) and 2.6 parts of 50% NaOH. The resulting mixture is aged for one hour and then 245 parts of terpolymer rubber latex are added. The resulting mixture is aged for a period of 72 hours.

After treatment with the RFL adhesive composition and drying, the yarn is taken up on a wind-up unit.

The adhesive characteristics of a 2-ply, 12×12 polyethylene terephthalate cord prepared from the yarn produced in accordance with the described procedure are determined according to a "H" adhesion test wherein a single treated cord is molded into a strip of rubber. The force which is required to pull the cord from the specimen is indicative of the degree of adhesion of the treated cord to the rubber. The specific test procedure is described more fully below.

An appropriate number of rubber strips are cut of dimension 0.375 inch by 6.5 inches. The strips are placed in mold cavities, with the polyethylene terephthalate cord placed in the mold cord slots and secured under pressure. Additional rubber strips are then placed in the mold upon the strips already present in the mold. The mold is covered with a smooth metal plate and placed in a steam heated press for curing. The mold is then removed from the press and the molded rubber stock specimen removed from the mold.

The specimen is cut to produce "H"-shaped specimens consisting of a cord with each end embedded in the center of the rubber tab on inch in length. An Instron Model 1130 tester is employed having a crosshead speed of 6 inches/minute and a gauge length appropriately sized to correspond to the size of the tab to measure the force required to separate the cord from one of the rubber ends.

Using the described "H" adhesion test, an adhesion of 26.6 pounds is obtained.

The polyethylene terephthalate cord is also subjected to a standard 250° F. Peel Test wherein the actual measured force and the observed adherency (using a scale of 1.0 to 5.0) is recorded. This test yields a result of 26 pounds/2.0.

EXAMPLE 1

The procedure of the Comparative Example is repeated except that prior to being contacted with the polyfunctional sorbitol epoxy adhesive, the yarn is exposed to a dose of 1.2 Mrads at a speed of 500 feet/minute by passing the yarn through an Energy Science, Inc. Electro-Curtin ® processor. This results in an "H" adhesion of 32.4 pounds and a 250° F. Peel Test of 40 pounds/3.0.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A process for the treatment of a polyethylene terephthlate material to improve the adhesion thereof in subsequent rubber-reinforcing applications comprising the steps of:
   (1) activating the surface of the polyethylene terephthalate material with an electron beam from a suitable source to promote free radical formation on said material;
   (2) permitting said free radicals to form hydrophilic carboxyl and hydroxyl functional groups under ambient conditions; and
   (3) applying an adhesive composition which is reactive to carboxyl or hydroxyl functional groups to said material, said adhesive composition being selected from the group consisting of:
      (i) multifunctional isocyanate compounds,
      (ii) epoxy compounds,
      (iii) mixtures of (i) and (ii), and
      (iv) mixtures of (i), (ii) or (iii) with a phenolic-aldehyde latex adhesive whereby the material is suitable for reinforcing rubber.

2. The process of claim 1 wherein said polyethylene terephthalate material comprises a filament or yarn.

3. The process of claim 1 wherein said adhesive composition is applied in a quantity of between about 0.05 to 10 percent by weight based on the weight of the material.

4. The process of claim 3 wherein said adhesive composition is applied in a quantity of between about 0.1 to 2.0 percent by weight based on the weight of the material.

5. The process of claim 1 wherein said adhesive comprises an epoxy.

6. The process of claim 1 wherein said adhesive comprises an isocyanate.

7. The process of claim 1 wherein said adhesive is cured by heat treatment subsequent to step (3).

8. The process of claim 1 wherein said polyethylene terephthalate material is in the form of a yarn which is spun into cord prior to step (1).

9. A process for the treatment of a polyethylene terephthlate filament or yarn to improve the adhesion thereof in subsequent rubber-reinforcing applications comprising the steps of:
   (1) applying a spin finish to the filament or yarn;
   (2) activating the surface of the polyethylene terephthalate filament or yarn with an electron beam from a suitable source to promote free radical formation on said material;
   (3) permitting said free radicals to form hydrophilic carboxyl and hydroxyl functional groups under ambient conditions; and
   (4) applying an adhesive composition which is reactive to carboxyl or hydroxyl functional groups to said filament or yarn, said adhesive composition being selected from the group consisting of:
      (i) multifunctional isocyanate compounds,
      (ii) epoxy compounds,
      (iii) mixtures of (i) and (ii), and
      (iv) mixtures of (i), (ii) or (iii) with a phenolic-aldehyde latex adhesive whereby the material is suitable for reinforcing rubber.

10. The process of claim 9 wherein said spin finish is applied in a quantity of between 0.1 to 5 weight percent based on the weight of the yarn.

11. The process of claim 9 wherein said adhesive composition is applied in a quantity of between about 0.05 to 10 percent by weight based on the weight of the yarn.

12. The process of claim 11 wherein said adhesive composition is applied in a quantity of between about 0.1 to 2.0 percent by weight based on the weight of the yarn.

13. The process of claim 9 wherein said adhesive comprises an epoxy.

14. The process of claim 9 wherein said adhesive comprises an isocyanate.

15. The process of claim 9 wherein said adhesive is cured by heat treatment subsequent to step (4).

16. A product produced by the process of claim 1.

17. A product produced by the process of claim 9.

18. A process for the treatment of a polyethylene terephthalate material to improve the adhesion thereof in subsequent rubber-reinforcing applications comprising the steps of:
(1) applying an adhesive composition which is reactive to carboxyl or hydroxyl functional groups to said material, said adhesive composition being selected from the consisting of multifunctional isocyanate compounds, epoxy compounds and mixtures thereof;
(2) activating the surface of the polyethylene terephthalate material with an electron beam from a suitable source to promote free radical formation on said material; and
(3) permitting said free radicals to form hydrophilic carboxyl and hydroxy functional groups under ambient conditions whereby the adhesive composition reacts with the carboxyl and hydroxyl functional groups whereby the material is suitable for reinforcing rubber.

19. The process of claim 18 wherein said polyethylene terephthalate material comprises a filament or yarn.

20. The process of claim 18 wherein said adhesive composition is applied in a quantity of between about 0.05 to 10 percent by weight based o the weight of the material.

21. The process of claim 20 wherein said adhesive composition is applied in a quantity of between about 0.1 to 2.0 percent by weight based on the weight of the material.

22. The process of claim 18 wherein said adhesive comprises an epoxy.

* * * * *